United States Patent
Goto

(10) Patent No.: US 10,338,860 B2
(45) Date of Patent: Jul. 2, 2019

(54) COMMUNICATION APPARATUS THAT CORRECTS THE RADIO FIELD INTENSITY OF A RECEIVED PACKET, AND METHOD OF CONTROLLING THE SAME

(71) Applicant: CANON KABUSHIKI KAISHA, Tokyo (JP)

(72) Inventor: Hiroaki Goto, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/460,625

(22) Filed: Mar. 16, 2017

(65) Prior Publication Data
US 2017/0277479 A1   Sep. 28, 2017

(30) Foreign Application Priority Data
Mar. 24, 2016 (JP) ................. 2016-060902

(51) Int. Cl.
G06F 3/12 (2006.01)
H04B 17/318 (2015.01)
H04W 4/02 (2018.01)

(52) U.S. Cl.
CPC ........... *G06F 3/121* (2013.01); *G06F 3/1294* (2013.01); *H04B 17/318* (2015.01); *H04W 4/02* (2013.01)

(58) Field of Classification Search
None
See application file for complete search history.

(56) References Cited

U.S. PATENT DOCUMENTS

| | | | | |
|---|---|---|---|---|
| 2004/0092231 A1* | 5/2004 | Ayatsuka | ............... | G06F 21/31 455/41.2 |
| 2012/0075672 A1* | 3/2012 | Oishi | ................... | G06F 3/1204 358/1.15 |
| 2015/0243156 A1* | 8/2015 | Itoh | ........................ | H04W 4/00 340/539.11 |
| 2016/0006902 A1* | 1/2016 | Okamoto | ........... | H04N 1/00342 358/1.13 |
| 2016/0173711 A1* | 6/2016 | Sasase | ............... | H04N 1/00307 358/1.15 |
| 2016/0255218 A1* | 9/2016 | Takahashi | .......... | H04N 1/00323 358/1.15 |
| 2016/0360477 A1* | 12/2016 | Saeki | ........................ | B41J 29/00 |
| 2017/0094449 A1* | 3/2017 | Murakawa | ............ | H04W 4/008 |

FOREIGN PATENT DOCUMENTS

JP   2015-200989   11/2015

\* cited by examiner

*Primary Examiner* — Henok Shiferaw
(74) *Attorney, Agent, or Firm* — Venable LLP

(57) ABSTRACT

A communication apparatus specifies a radio field intensity of a received packet, and executes processing using the radio field intensity. The apparatus receives a packet transmitted from an external apparatus, and determines a correction value of a radio field intensity of the packet based on model information of the external apparatus. Then, the radio field intensity of the packet is corrected using the determined correction value.

15 Claims, 13 Drawing Sheets

FIG. 6

|  | IMAGE FORMING APPARATUS A | IMAGE FORMING APPARATUS B | IMAGE FORMING APPARATUS C |
|---|---|---|---|
| MOBILE TERMINAL A | -8 | -11 | -8 |
| MOBILE TERMINAL B | -5 | -8 | -5 |
| MOBILE TERMINAL C | +3 | 0 | +3 |

| RADIO FIELD INTENSITY (dBm) | DISTANCE (cm) |
|---|---|
| -1~-33 | 10 |
| -34~-42 | 18 |
| -43~-46 | 33 |
| -47~-54 | 100 |
| -55~ | 101 OR MORE |

| APPARATUS NAME | ORIENTATION OF INSTALLED CHIP |
|---|---|
| IMAGE FORMING APPARATUS A | VERTICAL |
| IMAGE FORMING APPARATUS B | HORIZONTAL |
| IMAGE FORMING APPARATUS C | VERTICAL |

|  | VERTICAL | HORIZONTAL |
|---|---|---|
| MOBILE TERMINAL A | -8 | -11 |
| MOBILE TERMINAL B | -5 | -8 |
| MOBILE TERMINAL C | +3 | 0 |

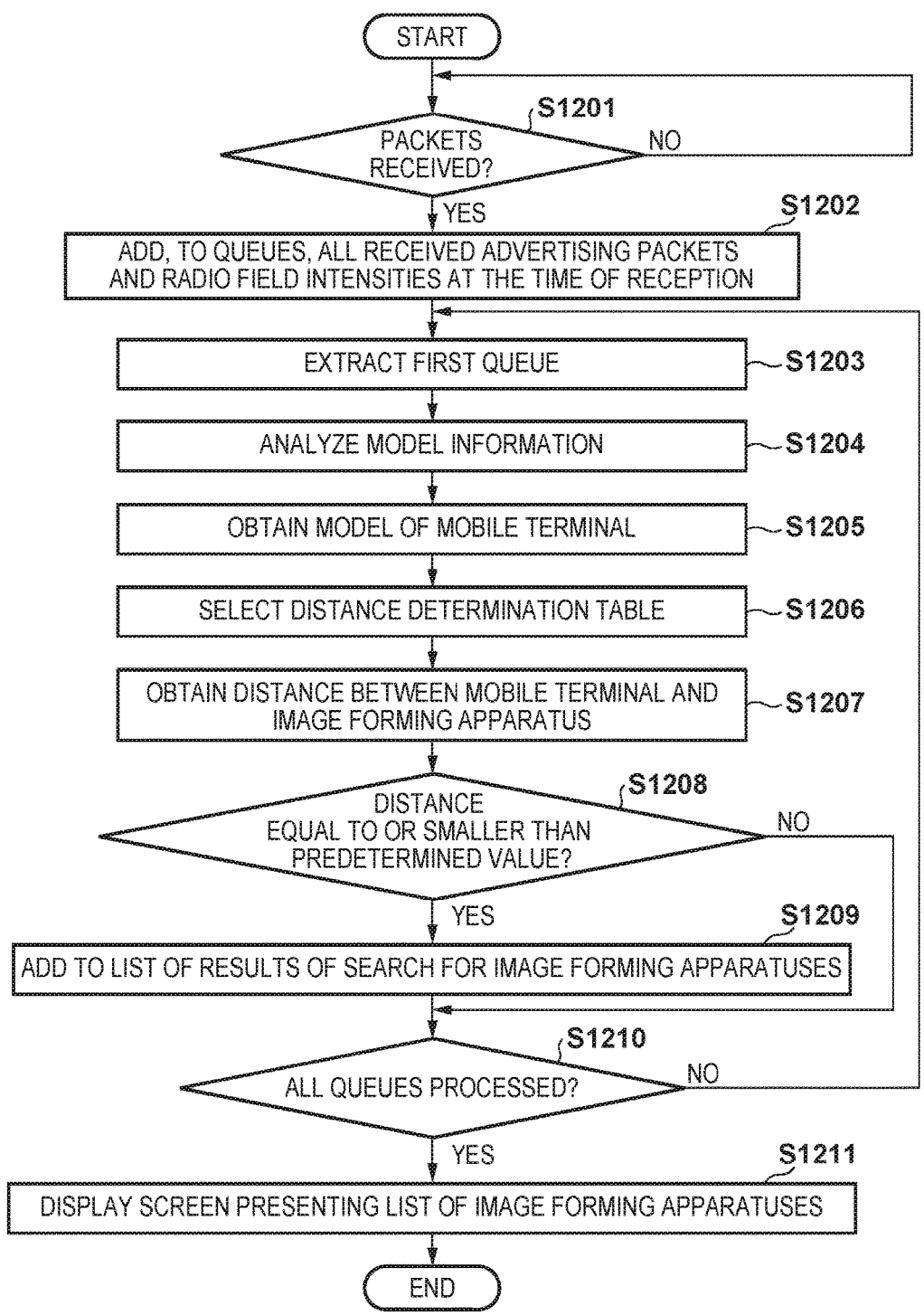

FIG. 13A

| | IMAGE FORMING APPARATUS A | IMAGE FORMING APPARATUS B | IMAGE FORMING APPARATUS C |
|---|---|---|---|
| MOBILE TERMINAL A | FIRST DISTANCE DETERMINATION TABLE | FOURTH DISTANCE DETERMINATION TABLE | FIRST DISTANCE DETERMINATION TABLE |
| MOBILE TERMINAL B | SECOND DISTANCE DETERMINATION TABLE | FIRST DISTANCE DETERMINATION TABLE | SECOND DISTANCE DETERMINATION TABLE |
| MOBILE TERMINAL C | THIRD DISTANCE DETERMINATION TABLE | FIFTH DISTANCE DETERMINATION TABLE | THIRD DISTANCE DETERMINATION TABLE |

FIG. 13B

| RADIO FIELD INTENSITY (dBm) | DISTANCE (cm) |
|---|---|
| -1~-41 | 10 |
| -42~-50 | 18 |
| -51~-54 | 33 |
| -55~-62 | 100 |
| -63~ | 101 OR MORE |

FIRST DISTANCE DETERMINATION TABLE

FIG. 13C

| RADIO FIELD INTENSITY (dBm) | DISTANCE (cm) |
|---|---|
| -1~-38 | 10 |
| -39~-47 | 18 |
| -48~-51 | 33 |
| -52~-59 | 100 |
| -60~ | 101 OR MORE |

SECOND DISTANCE DETERMINATION TABLE

FIG. 13D

| RADIO FIELD INTENSITY (dBm) | DISTANCE (cm) |
|---|---|
| -1~-30 | 10 |
| -31~-39 | 18 |
| -40~-43 | 33 |
| -44~-51 | 100 |
| -52~ | 101 OR MORE |

THIRD DISTANCE DETERMINATION TABLE

F I G. 13E

| RADIO FIELD INTENSITY (dBm) | DISTANCE (cm) |
|---|---|
| -1~-44 | 10 |
| -45~-53 | 18 |
| -54~-57 | 33 |
| -58~-65 | 100 |
| -66~ | 101 OR MORE |

FOURTH DISTANCE DETERMINATION TABLE

F I G. 13F

| RADIO FIELD INTENSITY (dBm) | DISTANCE (cm) |
|---|---|
| -1~-33 | 10 |
| -34~-42 | 18 |
| -43~-46 | 33 |
| -47~-54 | 100 |
| -55~ | 101 OR MORE |

FIFTH DISTANCE DETERMINATION TABLE

F I G. 14

|  | VERTICAL | HORIZONTAL |
|---|---|---|
| MOBILE TERMINAL A | FIRST DISTANCE DETERMINATION TABLE | FOURTH DISTANCE DETERMINATION TABLE |
| MOBILE TERMINAL B | SECOND DISTANCE DETERMINATION TABLE | FIRST DISTANCE DETERMINATION TABLE |
| MOBILE TERMINAL C | THIRD DISTANCE DETERMINATION TABLE | FIFTH DISTANCE DETERMINATION TABLE |

COMMUNICATION APPARATUS THAT CORRECTS THE RADIO FIELD INTENSITY OF A RECEIVED PACKET, AND METHOD OF CONTROLLING THE SAME

BACKGROUND OF THE INVENTION

Field of the Invention

The present invention relates to a communication apparatus and a method of controlling the same.

Description of the Related Art

It is crucial to specify a distance between information processing apparatuses (e.g., between an image forming apparatus and a mobile terminal). This is because various services (functions) can be provided between the apparatuses in accordance with the specified distance. For example, the mobile terminal may automatically execute processing for logging in the image forming apparatus upon detecting a decrease in the distance, that is, detecting that a user holding the mobile terminal has approached the image forming apparatus. This can save the user the trouble of performing a login operation. Conversely, the mobile terminal may automatically log out of the image forming apparatus if the distance between itself and the image forming apparatus increases, that is, if the user holding the mobile terminal moves away from the image forming apparatus. The image forming apparatus can be made inoperable if the user who logged in moves away from the image forming apparatus by a predetermined distance.

In this case, if the information processing apparatus has a wireless communication function, the distance can be specified by measuring the radio field intensities of radio waves of wireless communication. For example, assume a case in which the mobile terminal supports Bluetooth Low Energy (BLE) and receives BLE radio waves emitted by the image forming apparatus. The radio field intensities of wireless radio waves become higher when the distance is short, and lower when the distance is long, therefore, the distance can be accurately specified to some extent by measuring the radio field intensities. For example, Japanese Patent Laid-Open No. 2015-200989 describes technology for receiving, on a mobile terminal, wireless radio waves output from a plurality of wireless radio wave emission sources, and starting communication with the closest image forming apparatus based on the radio field intensities of the received radio waves.

However, the location and orientation of a BLE chip that emits radio waves may vary among different types of image forming apparatuses. In this case, even if the image forming apparatuses are distanced from a mobile terminal by the same distance and emit radio waves of the same radio field intensity, the mobile terminal may receive radio waves having different radio field intensities. This gives rise to the problem that accurate distances between the image forming apparatuses and the mobile terminal cannot be specified using the radio field intensities of wireless radio waves alone.

SUMMARY OF THE INVENTION

An aspect of the present invention is to eliminate the above-mentioned problem with conventional technology.

A feature of the present invention is to provide a technique for correcting the radio field intensity of radio waves received from an external apparatus in accordance with the model of the external apparatus, and accurately specifying an inter-apparatus distance based on the corrected radio field intensity.

According to a first aspect of the present invention, there is provided a communication apparatus that specifies a radio field intensity of a received packet and executes processing using the radio field intensity, the communication apparatus comprising: a memory device that stores a set of instructions; and at least one processor that executes the instructions to: receive a packet transmitted from an external apparatus, determine a correction value of a radio field intensity of the packet based on model information of the external apparatus, and correct the radio field intensity of the packet using the determined correction value.

According to a second aspect of the present invention, there is provided a communication apparatus that specifies a radio field intensity of a received packet and executes processing using the radio field intensity, the communication apparatus comprising: a memory device that stores a set of instructions; and at least one processor that executes the instructions to: receive a packet transmitted from an external apparatus, store first information showing a distance between the communication apparatus and the external apparatus and a radio field intensity of the packet in correspondence with each other, and, by specifying the stored first information based on model information of the external apparatus, obtain the distance between the communication apparatus and the external apparatus based on the first information and on the radio field intensity of the packet.

According to a third aspect of the present invention, there is provided a method of controlling a communication apparatus that specifies a radio field intensity of a received packet and executes processing using the radio field intensity, the method comprising: receiving a packet transmitted from an external apparatus; determining a correction value of a radio field intensity of the packet based on model information of the external apparatus; and correcting the radio field intensity of the packet using the determined correction value.

According to a fourth aspect of the present invention, there is provided a method of controlling a communication apparatus that specifies a radio field intensity of a received packet and executes processing using the radio field intensity, the method comprising: receiving a packet transmitted from an external apparatus; storing first information showing a distance between the communication apparatus and the external apparatus and a radio field intensity of the packet in correspondence with each other; and, by specifying the first information based on model information of the external apparatus, obtaining the distance between the communication apparatus and the external apparatus based on the first information and on the radio field intensity of the packet.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 depicts a view showing an example of a radio field intensity correction table held by the mobile terminal according to the first embodiment.

FIG. 7 depicts a view showing examples of standard relationships between distances and radio field intensities in the first embodiment.

FIG. 12 is a flowchart for describing processing in which the mobile terminal according to a third embodiment obtains distances between the mobile terminal and image forming apparatuses, and displays a list of image forming apparatuses that are located within a predetermined range.

FIGS. 13A to 13F are diagrams for respectively describing examples of distance determination tables according to a third embodiment.

FIG. 14 depicts a view showing an example of table referenced in step S1206 of FIG. 12 in a fourth embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
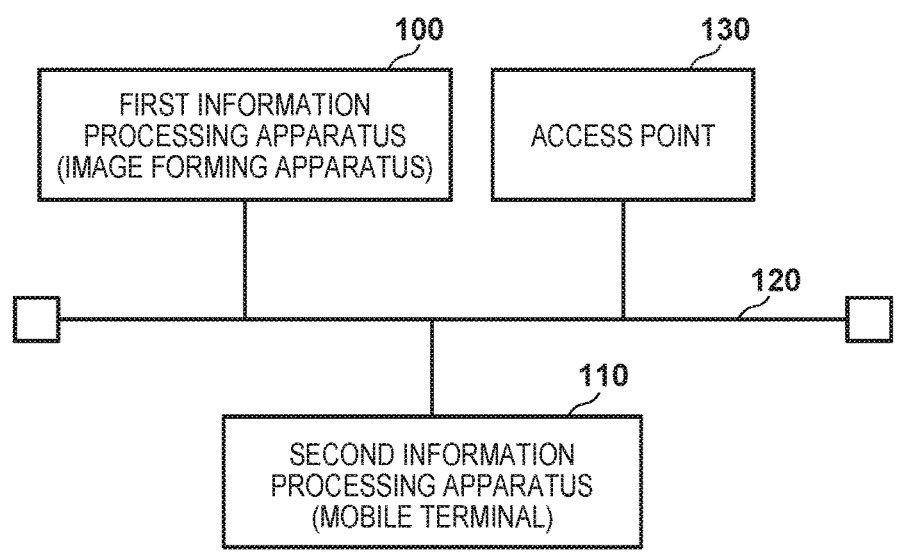
FIG. 1 depicts a view schematically showing a configuration of a communication system including a first information processing apparatus and a second information processing apparatus according to a first embodiment of the present invention.

FIG. 1 depicts a view schematically showing a configuration of a communication system including a first information processing apparatus and a second information processing apparatus according to a first embodiment of the present invention.

In the first embodiment, an image forming apparatus and a mobile terminal (communication apparatus) are described as examples of the first information processing apparatus and the second information processing apparatus, respectively. An access point 130 is connected to a network 120, and the first information processing apparatus (hereinafter, image forming apparatus) 100 and the second information processing apparatus (hereinafter, mobile terminal) 110 can communicate with each other via the network 120. If the image forming apparatus 100 and the mobile terminal 110 have a wireless direct communication function, the image forming apparatus 100 and the mobile terminal 110 can perform wireless communication directly with each other without intervention of the network 120. The mobile terminal 110 transmits print data to the image forming apparatus 100, and the image forming apparatus 100 interprets the received print data and executes print processing.

Figure 2:
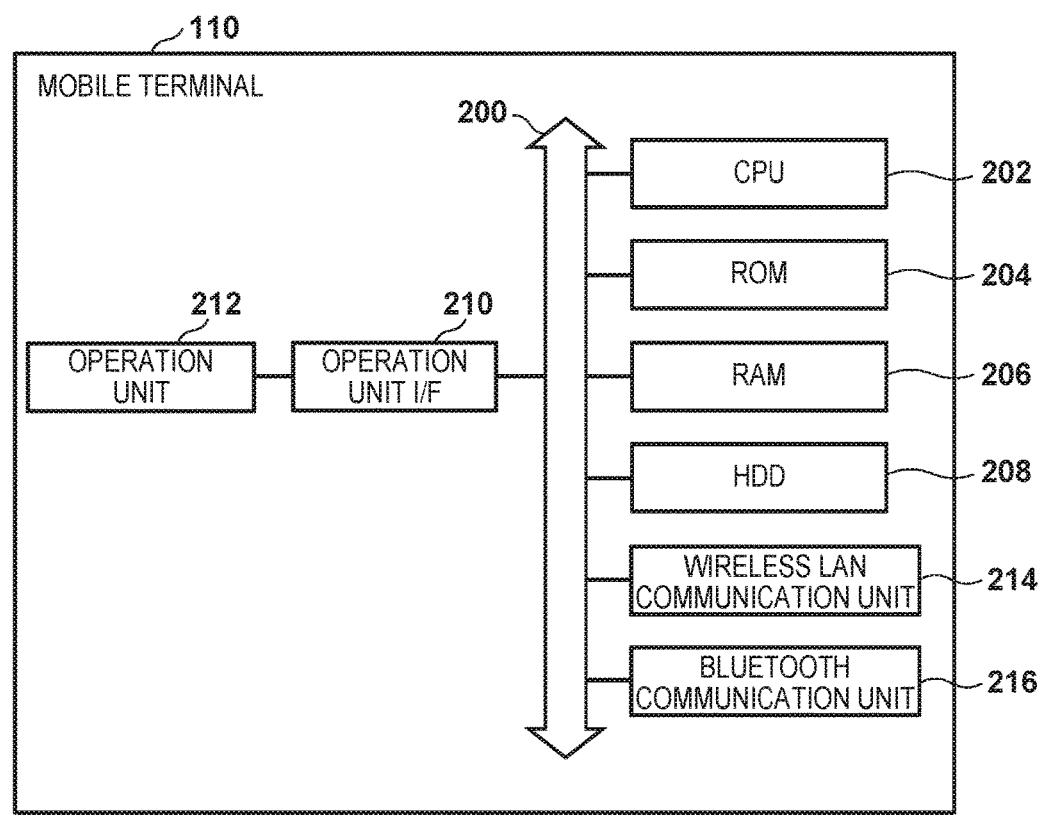
FIG. 2 is a block diagram for describing a configuration of a mobile terminal according to the first embodiment.

FIG. 2 is a block diagram for describing a configuration of the mobile terminal 110 according to the first embodiment.

A CPU 202 reads out control programs stored in a ROM 204 to control the operations of the mobile terminal 110, and the CPU 202 is connected to other components via a bus 200. The ROM 204 stores the control programs executed by the CPU 202. A RAM 206 is used as a main memory and a working area for the CPU 202. An HDD 208 stores programs executed by the CPU 202 and various types of data, such as image data. An operation unit I/F 210 establishes connection between an operation unit 212 and the bus 200. The operation unit 212 includes a display unit with a touchscreen function and a software keyboard, displays various types of screens, and accepts user operations. A user can input various types of instructions and information to the mobile terminal 110 via the operation unit 212. A wireless LAN communication unit 214 implements wireless communication with an external apparatus, such as the access point 130. A Bluetooth® communication unit 216 implements wireless communication with an external apparatus, such as the image forming apparatus 100, via Bluetooth. Furthermore, the Bluetooth communication unit 216 has a function of detecting the radio field intensities of wireless radio waves received from an external apparatus.

Figure 3:
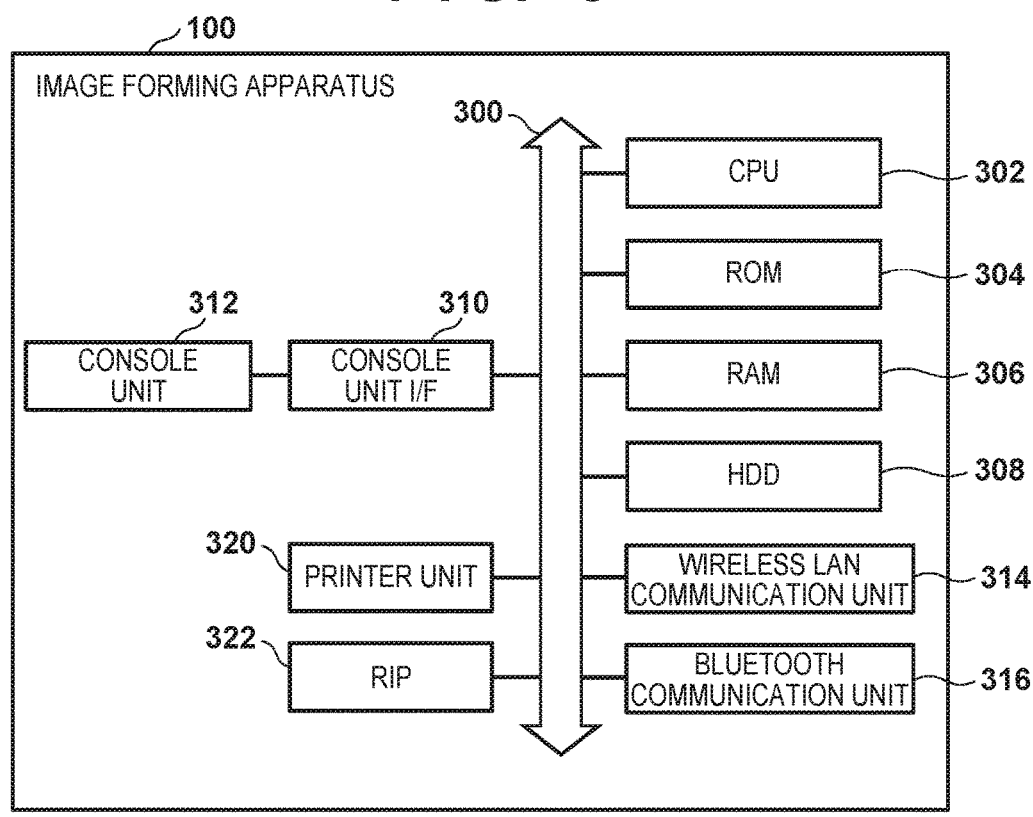
FIG. 3 is a block diagram describing a configuration of an image forming apparatus according to the first embodiment.

FIG. 3 is a block diagram for describing a configuration of the image forming apparatus 100 according to the first embodiment.

A CPU 302 controls the operations of the image forming apparatus 100 by executing a boot program stored in a ROM 304, deploying programs stored in a hard disk drive (HDD) 308 to a RAM 306, and executing the deployed programs. The CPU 302 is connected to other components via a bus 300. The ROM 304 stores the boot program, various types of data, and so forth. The RAM 306 is used as a temporary storage area, such as a main memory and a working area, for the CPU 302. The HDD 308 stores programs and various types of data, such as image data. A console unit I/F 310 establishes connection between a console unit 312 and the bus 300. The console unit 312 includes a display unit with a touchscreen function and a software keyboard, displays various types of screens, and accepts user operations. A user can input instructions and information to the image forming apparatus 100 via the console unit 312. A wireless LAN communication unit 314 implements wireless communication with an external apparatus, such as the access point 130. A Bluetooth communication unit 316 implements wireless communication with an external apparatus via Bluetooth. A printer unit 320 prints an image on a recording medium (sheet) based on bitmap image data generated by a rendering image processor (RIP) 322. The RIP 322 generates the bitmap image data by executing rendering processing based on rendering information.

Below, the first embodiment will be described in detail. In the first embodiment, the mobile terminal 110 obtains correction values of radio field intensities based on wireless communication radio waves transmitted from the image forming apparatus 100, and image forming apparatuses that are located within a predetermined range of the mobile terminal 110 are displayed on a screen of the operation unit 212 of the mobile terminal 110. The location of an installed BLE chip, or a BLE chip itself, may vary among different models of the image forming apparatus 100. For this reason, radio waves transmitted from the image forming apparatus 100 and received by the mobile terminal may have different radio field intensities even if the distance is the same. Similarly, as the location or type of a BLE chip may vary among different models of the mobile terminal 110, the mobile terminal 110 may detect different radio field intensities even if the distance is the same.

In view of this, to obtain an accurate distance between the mobile terminal 110 and the image forming apparatus 100, the mobile terminal 110 holds a table showing correction values of radio field intensities in correspondence with combinations of models of the image forming apparatus 100 and the mobile terminal 110 (hereinafter, a radio field intensity correction table). The image forming apparatus 100 notifies the mobile terminal 110 of model information of the image forming apparatus 100 by writing the model information in a BLE advertising packet. Upon receiving the model information, the mobile terminal 110 determines an appropriate correction value with reference to the radio field intensity correction table. Then, the mobile terminal 110 corrects the radio field intensity of the received advertising packet, and obtains a distance to the image forming apparatus using the corrected radio field intensity. The mobile terminal 110 displays a list of image forming apparatuses for which a distance equal to or smaller than a predetermined value has been obtained. In this way, a user can search for a nearby image forming apparatus with high precision without taking notice of the types of the mobile terminal and image forming apparatuses. This function is provided as, for example, non-illustrated application software installed in the image forming apparatus 100 and the mobile terminal 110. A detailed description will follow.

Figure 4:
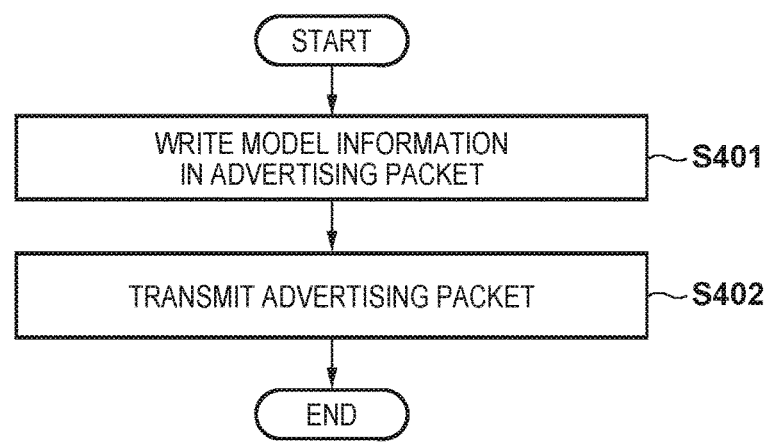
FIG. 4 is a flowchart for describing processing in which the image forming apparatus according to the first embodiment writes model information in an advertising packet and transmits the advertising packet.

FIG. 4 is a flowchart for describing processing in which the image forming apparatus 100 according to the first embodiment writes model information in an advertising packet of Bluetooth Low Energy (BLE) and transmits the advertising packet. A program that executes the processing of this flowchart is stored in the HDD 308, and the processing is implemented by the CPU 302 deploying the program to the RAM 306 and executing the deployed program.

First, in step S401, the CPU 302 writes model information of the image forming apparatus 100 in a BLE advertising packet to be transmitted from the Bluetooth communication unit 316. The model information includes, for example, a model number allocated on a per-model basis. Next, the processing proceeds to step S402 and the CPU 302 causes the Bluetooth communication unit 316 to transmit the BLE advertising packet including the model information written in step S401. This advertising packet also includes, for example, a MAC address of a transmission source of this advertising packet.

Accordingly, upon receiving this BLE advertising packet, the mobile terminal 110 can identify the model of the emission source of this BLE advertising packet.

Figure 5:
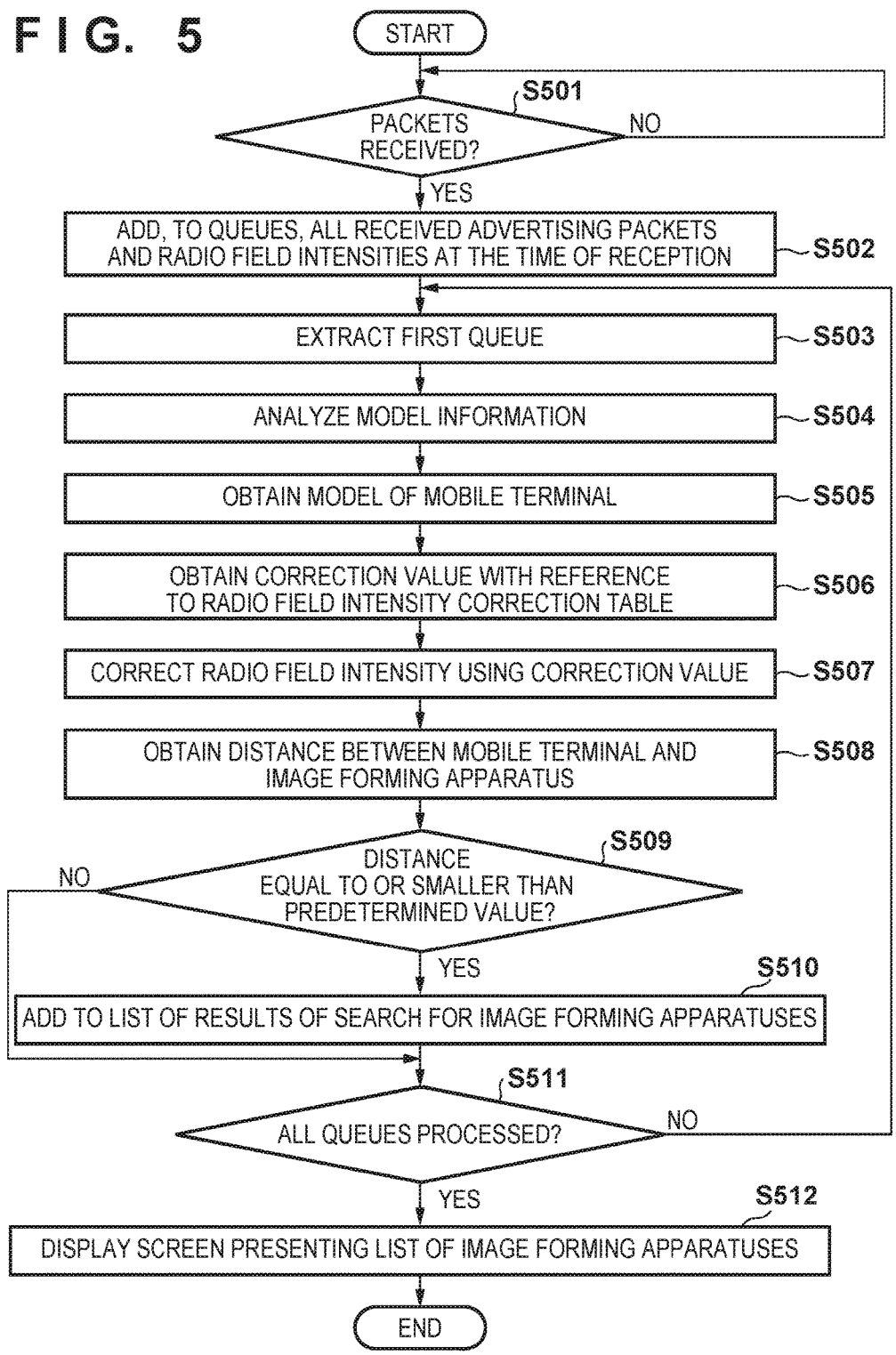
FIG. 5 is a flowchart for describing processing in which the mobile terminal according to the first embodiment obtains distances between the mobile terminal and image forming apparatuses, and displays a list of image forming apparatuses that are located within a predetermined range.

FIG. 5 is a flowchart for describing processing in which the mobile terminal 110 according to the first embodiment obtains distances between the mobile terminal 110 and image forming apparatuses, and displays a list of image forming apparatuses that are located within a predetermined range. The processing of this flowchart is implemented by the CPU 202 executing a program deployed from the ROM 204 or the HDD 208 to the RAM 206. Herein, the mobile terminal 110 obtains distances between the mobile terminal 110 and image forming apparatuses by obtaining correction values of radio field intensities of received radio waves and correcting the radio field intensities based on model information of the image forming apparatuses and model information of the mobile terminal 110.

First, in step S501, the CPU 202 determines whether or not advertising packets emitted in step S402 of FIG. 4 have been received. If the advertising packets have been received, the processing proceeds to step S502. In step S502, the CPU 202 adds, to queues for a list of results of search, the advertising packets received by the Bluetooth communication unit 216 and the radio field intensities at the time of reception of the advertising packets. Next, the processing proceeds to step S503 and the CPU 202 extracts the first queue from the queues to which the advertising packets and the radio field intensities were added in step S502. Next, the processing proceeds to step S504, and the CPU 202 analyzes model information included in the advertising packet in the queue extracted in step S503, and stores the result of the analysis in the RAM 206. Next, the processing proceeds to step S505, and the CPU 202 obtains model information of the mobile terminal 110, and stores the obtained model information in the RAM 206. The obtained model information is information for specifying the model of the mobile terminal, and is identical to model information of mobile terminals of the same model.

Next, the processing proceeds to step S506, and the CPU 202 obtains an appropriate correction value by referencing the radio field intensity correction table using the model information of an image forming apparatus analyzed in step S504 and the model information of the mobile terminal 110 analyzed in step S505, and stores the obtained correction value in the RAM 206. Next, the processing proceeds to step S507, and the CPU 202 corrects the radio field intensity extracted in step S503 using the correction value stored in the RAM 206 in step S506, and stores the corrected radio field intensity in the RAM 206.

FIG. 6 depicts a view illustrating an example of the radio field intensity correction table held by the mobile terminal 110 according to the first embodiment. This radio field intensity correction table is stored in, for example, the HDD 208.

Registered with this radio field intensity correction table are correction values for correcting radio field intensities of received radio waves in correspondence with combinations of models of mobile terminals and models of image forming apparatuses. In this example, a mobile terminal A is the same as the mobile terminal 110 according to the first embodiment, and other mobile terminals B and C are not illustrated. Furthermore, an image forming apparatus A is the same as the image forming apparatus 100 according to the first embodiment, and other image forming apparatuses B and C are not illustrated. Therefore, the mobile terminal 110 may register only correction values for the image forming apparatuses A to C corresponding to the mobile terminal A as the radio field intensity correction table. In this case, correction values for correcting the radio field intensities of received radio waves are obtained based on model information of image forming apparatuses that transmitted the received packets. As indicated by 601 in FIG. 6, a correction value for the combination of the mobile terminal 110 and the image forming apparatus 100 according to the first embodiment is "−8". Therefore, in step S507, the CPU 202 obtains the corrected radio field intensity by subtracting 8 dBm from the radio field intensity extracted in step S503.

Next, the processing proceeds to step S508, and the CPU 202 obtains a distance between the mobile terminal 110 and the image forming apparatus 100 based on the radio field intensity obtained in step S507, and stores the obtained distance in the RAM 206. For example, assume that the radio field intensity between the mobile terminal 110 and the image forming apparatus 100, which was extracted in step S503, is −38 dBm. As the correction value for the combination of the mobile terminal 110 and the image forming apparatus 100 is −8 dBm as shown in the radio field intensity correction table of FIG. 6, the corrected radio field intensity is −38 dBm+(−8 dBm)=−46 dBm.

FIG. 7 depicts a view illustrating examples of standard relationships between distances and radio field intensities in the first embodiment.

Here, distances (cm) between a mobile terminal and an image forming apparatus are stored in correspondence with ranges of radio field intensities.

Provided that the corrected radio field intensity calculated in step S508 is −46 dBm as in the aforementioned example, the distance between the mobile terminal 110 and the image forming apparatus 100 is 33 cm as shown in FIG. 7.

Next, the processing proceeds to step S509 and the CPU 202 determines whether or not the distance between the mobile terminal 110 and the image forming apparatus, which was stored in the RAM 206 in step S508, is equal to or smaller than a predetermined value. If it is determined that the distance is equal to or smaller than the predetermined value, the processing proceeds to step S510, otherwise, the processing proceeds to step S511. In the first embodiment, it will be assumed that this predetermined value is 0.33 m (33 cm), for example. In step S510, the CPU 202 adds the image forming apparatus that emitted the advertising packet extracted in step S503 to the list of results of search for image forming apparatuses, thereafter, the processing proceeds to step S511. In step S511, the CPU 202 determines whether or not all of the queues for the list of results of search handled in step S502 have been processed. The processing proceeds to step S512 if it determines that all of the queues have been processed, and proceeds to step S503 if it determines to the contrary. In step S512, the CPU 202 displays a screen presenting a list of image forming apparatuses that are located within the predetermined range on the operation unit 212 based on the list of results of search for image forming apparatuses generated in step S510, thereafter, the present processing is ended.

Figure 8:
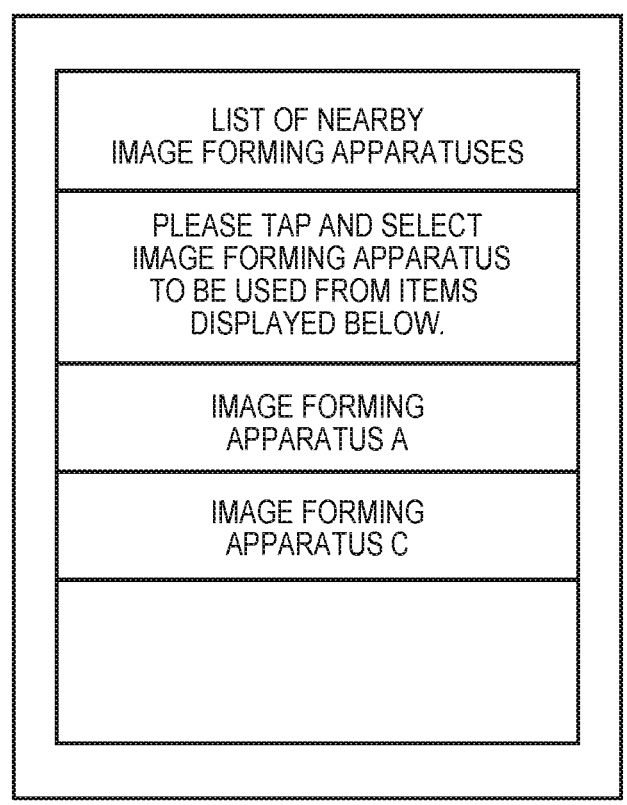
FIG. 8 depicts a view showing an example of a screen presenting a list of image forming apparatuses displayed on an operation unit of the mobile terminal according to the first embodiment.

FIG. 8 depicts a view showing an example of the screen presenting the list of image forming apparatuses displayed on the operation unit 212 of the mobile terminal 110 according to the first embodiment. Specifically, the screen of FIG. 8 presenting the list of image forming apparatuses pertains to a case in which distances between the image forming apparatuses A and C and the mobile terminal 110 are equal to or smaller than 0.33 m.

As described above, in the first embodiment, correction values of radio field intensities are obtained based on combinations of mobile terminals and image forming apparatuses that emitted advertising packets received by the mobile terminals. The radio field intensities at the time of reception by the mobile terminals are corrected using the correction values, and the distances between the mobile terminals and the image forming apparatuses are obtained based on the corrected radio field intensities. As a result, the distances between the mobile terminals and the image forming apparatuses can be detected more accurately.

Second Embodiment

A second embodiment of the present invention will now be described. The second embodiment introduces an example in which the mobile terminal 110 obtains a correction value of a radio field intensity in accordance with the orientation of a BLE chip installed in an image forming apparatus with which it communicates. As the configurations of the image forming apparatus 100 and the mobile terminal 110 according to the second embodiment are similar to those according to the above-described first embodiment, a description thereof will be omitted.

Figures 9A, 9B, 10:
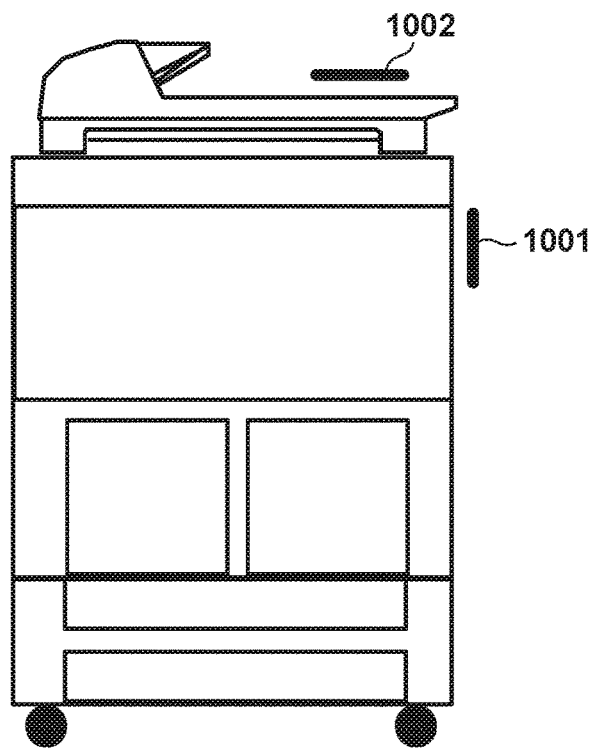
FIGS. 9A and 9B depict views respectively illustrating examples of radio field intensity correction tables held by the mobile terminal according to a second embodiment.
FIG. 10 depicts a view illustrating an example of the orientation of a BLE chip installed in an image forming apparatus.

FIGS. 9A and 9B depict views showing examples of radio field intensity correction tables held by the mobile terminal 110 according to the second embodiment. These radio field intensity correction tables are stored in, for example, the HDD 208.

FIG. 9A depicts a view showing whether the orientations of BLE chips installed in image forming apparatuses are vertical or horizontal with respect to the ground on which the image forming apparatus are placed. In the example shown, the orientation is vertical in each of image forming apparatuses A and C, and horizontal in an image forming apparatus B.

FIG. 10 depicts a view illustrating an example of the orientation of a BLE chip installed in an image forming apparatus.

A vertical orientation of the installed BLE chip refers to a state where the BLE chip is attached to a side surface of the image forming apparatus as indicated by 1001. On the other hand, a horizontal orientation of the installed BLE chip refers to a state where the BLE chip is attached to a top surface of the image forming apparatus as indicated by 1002. It is presumed that the direction of emission of radio waves varies depending on whether the orientation of the installed BLE chip, which emits the radio waves, is vertical or horizontal, thereby affecting the receiving sensitivity at the mobile terminal 110.

FIG. 9B depicts a view showing examples of correction values for mobile terminals in correspondence with the orientations of the BLE chips installed in the image forming apparatuses.

For example, a mobile terminal B selects a correction value of −8 dBm for an image forming apparatus in which a BLE chip is installed in a horizontal orientation. That is, the image forming apparatuses are categorized depending on whether the orientations of the BLE chips installed therein are vertical or horizontal. The orientation of a BLE chip installed in the image forming apparatus 100 is determined based on model information received therefrom, and a correction value to be used by the mobile terminal 110 to correct a radio field intensity in relation to the image forming apparatus 100 is determined based on the determined orientation. In the second embodiment, categorization is made based on whether the orientations of the installed BLE chips are vertical or horizontal. However, a correction value may be determined by making categorization based on, for example, the location or type of an installed BLE chip.

Figure 11:
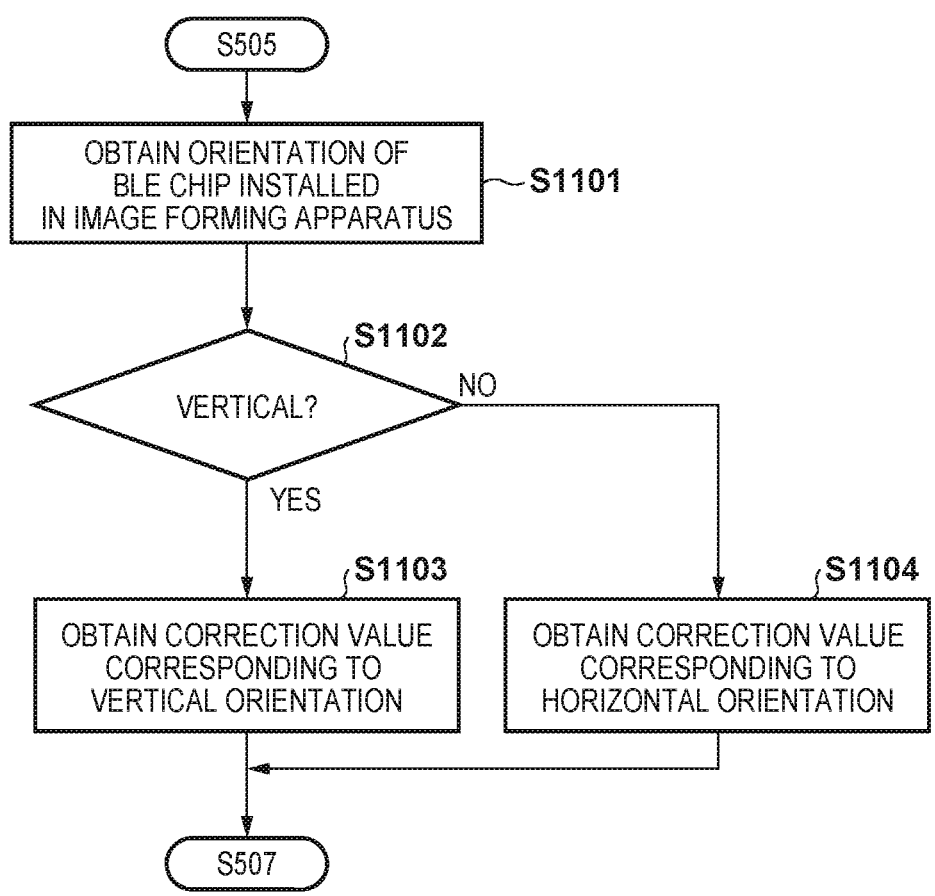
FIG. 11 is a flowchart for describing processes that are executed by the mobile terminal according to the second embodiment in step S506 of FIG. 5.

FIG. 11 is a flowchart for describing processes that are executed by the mobile terminal 110 according to the second embodiment in step S506 of FIG. 5. Other processes executed by the mobile terminal 110, that is, processes for obtaining a distance to the image forming apparatus 100 and displaying a list of image forming apparatuses that are located within a predetermined range, are the same as those shown in FIG. 5. The processing of this flowchart is implemented by the CPU 202 executing a program deployed from the ROM 204 or the HDD 208 to the RAM 206.

In step S1101, based on the model information of the image forming apparatus obtained in step S504, the CPU 202 obtains the orientation of a BLE chip installed in the image forming apparatus with reference to the table of FIG. 9A. Then, the processing proceeds to step S1102 and the CPU 202 determines whether or not the orientation of the installed BLE chip is vertical. If it determines that the orientation is vertical, the processing proceeds to step S1103 and the CPU 202 obtains, for example, a correction value corresponding to a vertical orientation shown in FIG. 9B. For example, in the case of the mobile terminal A, −8 dBm is obtained as the correction value, thereafter, the processing proceeds to step S507. On the other hand, if the CPU 202 determines in step S1102 that the orientation of the installed BLE chip is horizontal, the processing proceeds to step S1104 and the CPU 202 obtains, for example, a correction value corresponding to a horizontal orientation shown in FIG. 9B. For example, in the case of the mobile terminal A, −11 dBm is obtained as the correction value, thereafter, the processing proceeds to step S507. Then, in step S507, the CPU 202 corrects the radio field intensity that was read out in step S503 based on the correction value obtained in step S1103 or S1104.

As described above, according to the second embodiment, a radio field intensity is corrected by obtaining a correction value for correcting the radio field intensity depending on whether the orientation of a BLE chip installed in an image forming apparatus is vertical or horizontal. This is effective as a measure to be taken when the receiving sensitivity at a mobile terminal is affected by a varying direction of emission of radio waves depending on whether a BLE chip, which emits the radio waves, is installed in a vertical orientation or a horizontal orientation.

Third Embodiment

A third embodiment of the present invention will now be described. The third embodiment introduces an example in which the mobile terminal 110 has distance determination tables corresponding to combinations of the model of the mobile terminal and the models of image forming apparatuses with which the terminal communicates, and obtains distances based on these tables and radio field intensities. As the configurations of the image forming apparatus 100 and the mobile terminal 110 according to the third embodiment are similar to those according to the above-described first embodiment, a description thereof will be omitted.

FIG. 12 is a flowchart for describing processing in which the mobile terminal 110 according to the third embodiment obtains distances between the mobile terminal 110 and image forming apparatuses, and displays a list of image forming apparatuses that are located within a predetermined range. The processing of this flowchart is implemented by the CPU 202 executing a program deployed from the ROM 204 or the HDD 208 to the RAM 206. In FIG. 12, the processes of steps S1201 to S1205 and steps S1208 to S1211 are the same as the processes of steps S501 to S505 and steps S509 to S512 of FIG. 5 according to the above-described first embodiment, and thus a description thereof will be omitted.

In step S1206, the CPU 202 obtains an appropriate distance determination table using the model information of the image forming apparatus 100 analyzed and obtained in step S1204, as well as the model information of the mobile terminal 110 obtained in step S1205, and stores the obtained distance determination table to the RAM 206.

FIGS. 13A to 13F depict views for explaining examples of the distance determination tables according to the third embodiment.

FIG. 13A depicts a view showing an example of a table that defines distance determination tables to be referenced in correspondence with combinations of mobile terminals and image forming apparatuses. FIGS. 13B to 13F illustrate examples of first to fifth distance determination tables.

In these examples, a mobile terminal A is the same as the mobile terminal 110, and an image forming apparatus A is equivalent to the image forming apparatus 100. In the case of this combination, the first distance determination table (FIG. 13B) is selected as shown in FIG. 13A.

Thus, in step S1207, the CPU 202 specifies a distance between the mobile terminal 110 and the image forming apparatus 100 from the radio field intensity in the queue extracted in step S1203 and the distance determination table stored to the RAM 206 in step S1206. In the foregoing case, the first distance determination table is selected in step S1206. Here, provided that the radio field intensity of received radio waves is, for example, −38 dBm, the distance between the mobile terminal 110 and the image forming apparatus 100 is determined as 10 cm as shown in FIG. 13B.

As described above, according to the third embodiment, a distance between a mobile terminal and an image forming apparatus can be obtained from model information of the mobile terminal and the image forming apparatus and the radio field intensity of radio waves received by the mobile terminal.

Fourth Embodiment

A fourth embodiment of the present invention will now be described. The fourth embodiment introduces an example in which the mobile terminal 110 selects a distance determination table in accordance with the orientation of a BLE chip installed in an image forming apparatus with which it communicates and the model of the mobile terminal 110, and obtains a distance based on the selected table and the radio field intensity. As the configurations of the image forming apparatus 100 and the mobile terminal 110 according to the fourth embodiment are similar to those according to the above-described first embodiment, a description thereof will be omitted.

FIG. 14 depicts a view illustrating an examples of table referenced in step S1206 of FIG. 12 in the fourth embodiment.

Here, a distance determination table to be selected is specified based on the model of a mobile terminal and whether the orientation of a BLE chip installed in an image forming apparatus is vertical or horizontal. For example, in the case of a mobile terminal B, the first distance determination table (FIG. 13B) is selected for an image forming apparatus in which a BLE chip is installed in a horizontal orientation, and the second distance determination table (FIG. 13C) is selected for an image forming apparatus in which a BLE chip is installed in a vertical orientation. That is, a distance determination table corresponding to the model of the mobile terminal 110 is determined by determining whether the orientation of a BLE chip installed in the image forming apparatus 100 is vertical or horizontal based on the model information of the image forming apparatus. In the present fourth embodiment, categorization is made based on whether the orientations of BLE chips installed in image forming apparatuses are vertical or horizontal. However, a distance determination table may be determined in accordance with, for example, the location or type of an installed BLE chip.

Figure 15:
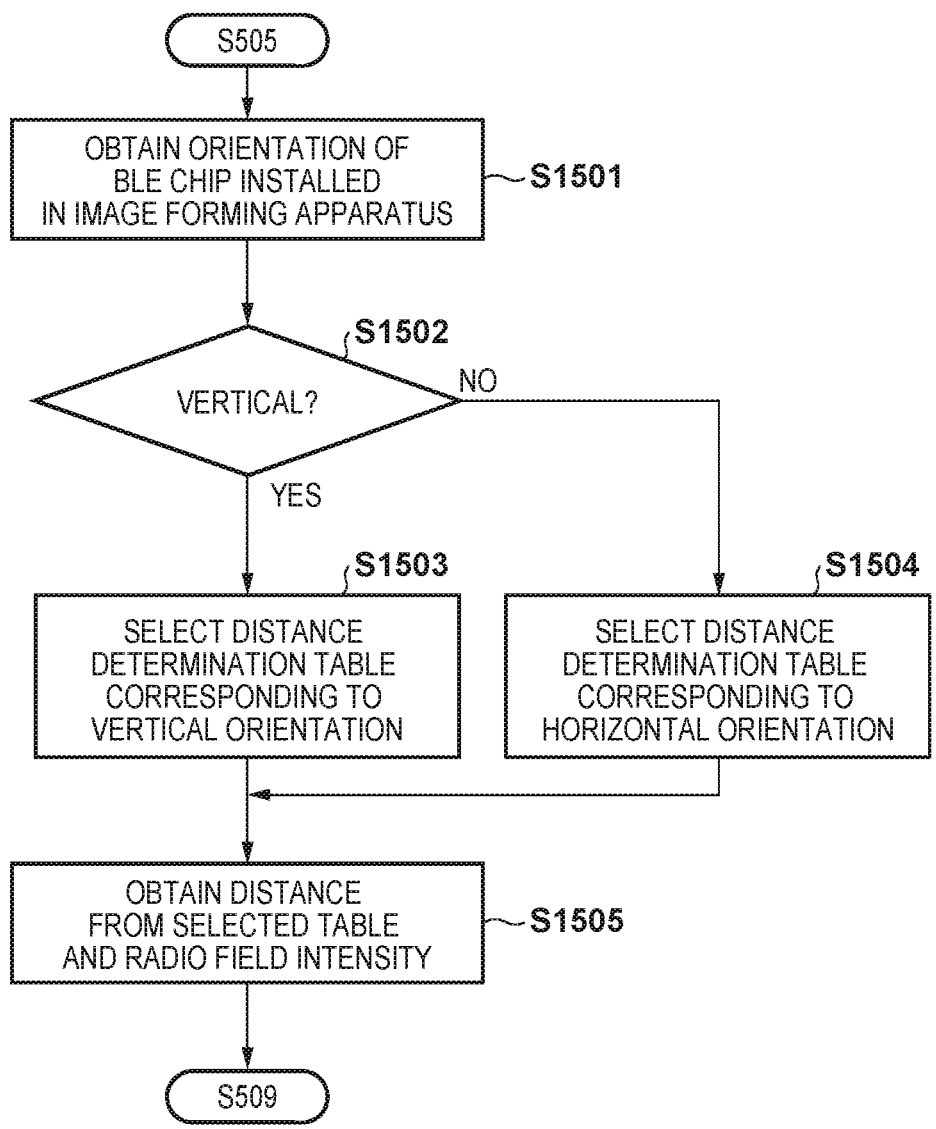
FIG. 15 is a flowchart for describing processes that are executed by the mobile terminal according to the fourth embodiment in place of steps S506 to S508 of FIG. 5.

FIG. 15 is a flowchart for describing processes that are executed by the mobile terminal 110 according to the fourth embodiment in place of steps S506 to S508 of FIG. 5. Other processes executed by the mobile terminal 110, that is, processes for obtaining a distance to the image forming apparatus 100 and displaying a list of image forming apparatuses that are within a predetermined range, are the same as those shown in FIG. 5. The processing of this flowchart is implemented by the CPU 202 executing a program deployed from the ROM 204 or the HDD 208 to the RAM 206.

The CPU 202 obtains the model information of the mobile terminal 110 in step S505, and then the processing proceeds to step S1501. In step S1501, based on the model information of the image forming apparatus analyzed and obtained in step S504, the CPU 202 obtains the orientation of a BLE chip installed in the image forming apparatus. Here, the orientation of the BLE chip installed in the image forming apparatus is obtained with reference to, for example, the table shown in FIG. 9A described earlier. Next, the processing proceeds to step S1502 and the CPU 202 determines whether or not the orientation of the BLE chip installed in the image forming apparatus is vertical. If the CPU 202 determines that the orientation is vertical, the processing proceeds to step S1503 and the CPU 202 selects a corresponding distance determination table based on the model of the mobile terminal 110 and the vertical orientation of the installed BLE chip with reference to the table of FIG. 14, and then the processing proceeds to step S1505. On the other hand, if the CPU 202 determines in step S1502 that the orientation is horizontal, the processing proceeds to step S1504 and the CPU 202 selects a corresponding distance determination table based on the model of the mobile terminal 110 and the horizontal orientation of the installed BLE chip with reference to the table of FIG. 14, and then the processing proceeds to step S1505. In step S1505, the CPU 202 obtains a distance between the mobile terminal 110 and the image forming apparatus based on the distance determination table selected in step S1503 or S1504 and the radio field intensity that was read out in step S503; thereafter, the processing proceeds to step S509.

As described above, according to the fourth embodiment, a distance between a mobile terminal and an image forming apparatus can be obtained in view of the radio field intensity based on whether the orientation of a BLE chip installed in the image forming apparatus is vertical or horizontal. This is effective as a measure to be taken when the receiving sensitivity at a mobile terminal is affected by a varying direction of emission of radio waves depending on whether a BLE chip, which emits the radio waves, is installed in a vertical orientation or a horizontal orientation.

Other Embodiment

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-060902, filed Mar. 24, 2016, which is hereby incorporated by reference herein in its entirety.

What is claimed is:

1. A communication apparatus that specifies a radio field intensity of a received packet and executes processing using the radio field intensity, the communication apparatus comprising:
   a memory device that stores instructions and correction values, wherein the stored correction values are predetermined based on transmitting units mounted on a plurality of external apparatuses; and
   at least one processor that executes the instructions to:
   receive a packet transmitted from a transmitting unit mounted on an external apparatus,
   determine, from the stored correction values, a correction value of a radio field intensity of the received packet based on model information of the external apparatus included in the received packet;
   correct the radio field intensity of the packet using the determined correction value; and
   execute a predetermined process using the corrected radio field intensity of the packet.

2. The communication apparatus according to claim 1, wherein the memory device stores the correction values in correspondence with both of model information of the plurality of external apparatuses and model information of communication apparatuses, and
   wherein the correction value of the radio field intensity of the received packet is determined, from the stored correction values, based on the model information of the external apparatus included in the received packet and the model information of the communication apparatus that receives the packet.

3. The communication apparatus according to claim 1, wherein the memory device stores the correction values in correspondence with orientations of the transmitting units, and stores information of each orientation of the transmitting units in correspondence with the model information of each of the external apparatuses, and,
   wherein the correction value of the radio field intensity of the received packet is determined, from the stored correction values, based on information of the orientation of the transmitting unit that is stored in the memory device in correspondence with the model information of the external apparatus included in the received packet.

4. The communication apparatus according to claim 3, wherein the orientations of the transmitting units are vertical and horizontal.

5. The communication apparatus according to claim 1,
wherein the executed processing is a process for specifying a distance between the communication apparatus and the external apparatus whose transmitting unit transmitted the packet based on the corrected radio field intensity of the packet.

6. The communication apparatus according to claim 5,
wherein the distance between the communication apparatus and the external apparatus whose transmitting unit transmitted the packet is specified, by the at least one processor, with reference to a table showing the radio field intensity and the distance in correspondence with each other.

7. The communication apparatus according to claim 5,
wherein the at least one processor executes the instructions to further display a list of external apparatuses for which a distance equal to or smaller than a predetermined value has been specified.

8. A method of controlling a communication apparatus, the method comprising:
  storing correction values that are pre-determined based on transmitting units mounted on a plurality of external apparatuses;
  receiving a packet transmitted from a transmitting unit mounted on an external apparatus;
  determining, from the stored correction values, a correction value of a radio field intensity of the received packet based on model information of the external apparatus included in the received packet;
  correcting the radio field intensity of the packet using the determined correction value; and
  executing a predetermined process using the corrected radio field intensity of the packet.

9. The method according to claim 8,
wherein the correction values are stored in correspondence with both of model information of the plurality of external apparatuses and model information of communication apparatuses, and
wherein the correction value of the radio field intensity of the received packet is determined, from the stored correction values, based on the model information of the external apparatus included in the received packet and the model information of the communication apparatus that receives the packet.

10. The method according to claim 8,
wherein in the storing the correction values are stored in correspondence with orientations of the transmitting units into a memory, and
wherein in the storing, information of each orientation of the transmitting unit is stored in correspondence with the model information of each of the external apparatuses into the memory,
wherein in the determining, the correction value of the radio field intensity of the received packet is determined, from the stored correction values, based on information of the orientation of the transmitting unit that is stored in the memory in correspondence with the model information of the external apparatus included in the received packet.

11. The method according to claim 10,
wherein the orientations of the transmitting unit are vertical and horizontal.

12. The method according to claim 8,
wherein the executed process is a process for specifying a distance between the communication apparatus and the external apparatus whose transmitting unit transmitted the packet based on the corrected radio field intensity of the packet.

13. The method according to claim 12,
wherein in the specifying, the distance between the communication apparatus and the external apparatus whose transmitting unit transmitted the packet is specified with reference to a table showing the radio field intensity and the distance in correspondence with each other.

14. The method according to claim 12, further comprising:
  displaying a list of external apparatuses for which a distance equal to or smaller than a predetermined value has been specified in the specifying.

15. A non-transitory computer-readable storage medium that stores a program and correction values, wherein the stored correction values are pre-determined based on transmitting units mounted on a plurality of external apparatuses, and
  wherein a processor of a communication apparatus executes the program to perform:
    receiving a packet transmitted from a transmitting unit mounted on an external apparatus;
    determining, from the stored correction values, a correction value of a radio field intensity of the received packet based on model information of the external apparatus included in the received packet;
    correcting the radio field intensity of the packet using the determined correction value; and
    executing a predetermined process using the corrected radio field intensity of the packet.

* * * * *